INVENTOR.
HERMAN GOLD

INVENTOR.
HERMAN GOLD

Sept. 2, 1958 H. GOLD 2,850,047
MACHINE FOR PACKING DRY CHEESE CURD
Filed July 7, 1955 9 Sheets-Sheet 4

INVENTOR.
HERMAN GOLD
BY
his ATTORNEYS.

Sept. 2, 1958            H. GOLD            2,850,047

MACHINE FOR PACKING DRY CHEESE CURD

Filed July 7, 1955            9 Sheets-Sheet 5

INVENTOR.
HERMAN GOLD

BY

*his* ATTORNEYS.

Sept. 2, 1958 H. GOLD 2,850,047
MACHINE FOR PACKING DRY CHEESE CURD
Filed July 7, 1955 9 Sheets-Sheet 6

INVENTOR.
HERMAN GOLD
BY
Campbell, Brumbaugh, Free & Graves
his ATTORNEYS.

INVENTOR.
HERMAN GOLD

Sept. 2, 1958  H. GOLD  2,850,047
MACHINE FOR PACKING DRY CHEESE CURD
Filed July 7, 1955  9 Sheets-Sheet 8

INVENTOR.
HERMAN GOLD
BY
Campbell, Brumbaugh, Free & Graves
his ATTORNEYS.

Sept. 2, 1958 H. GOLD 2,850,047
MACHINE FOR PACKING DRY CHEESE CURD
Filed July 7, 1955 9 Sheets-Sheet 9

INVENTOR.
HERMAN GOLD
BY
*Campbell, Brumbaugh, Free & Graves*
his ATTORNEYS.

United States Patent Office 2,850,047
Patented Sept. 2, 1958

2,850,047

MACHINE FOR PACKING DRY CHEESE CURD

Herman Gold, Paterson, N. J., assignor, by mesne assignments, to National Dairy Products Corporation, New York, N. Y., a corporation of Delaware Application July 7, 1955, Serial No. 520,463

12 Claims. (Cl. 141—80)

This invention relates to a machine for filling and packing containers with predetermined quantities of a substance, and more particularly, to a machine of that general organization for handling dry substances, such as dry cheese curd.

In one type of conventional machine for handling creamed cottage cheese, a predetermined quantity of the cheese is withdrawn from a hopper through a rotatable valve and drawn into a chamber by the suction stroke of a piston. The valve is then rotated to a different position, and on the pressure stroke of the piston and cheese is introduced into the container to be filled.

The filling and packing of dry cheese curd in containers, however, raises special problems, and machines employed for handling creamed cottage cheese cannot be used. Creamed cottage cheese is more easily handled than dry curd because it is a semi-fluid having no air spaces, whereas dry curd is pasty, contains air spaces, and has extremely poor flow characteristics. In fact, dry curd is so difficult to handle that the filling and packing operation is ordinarily done by hand.

The object of the present invention is to provide a machine for handling dry curd and for packing it in measured quantities in containers on a mass production basis. In the machine of the present invention the dry curd is delivered to a hopper and advanced towards the discharge end of the hopper without back pressure by a rotating worm conveyor. The dry curd is discharged from the hopper into a filling chute, however, the dry curd is held within the filling chute by a slidable valve gate until the worm conveyor has delivered the desired quantity of the dry curd to the chute to fill a container.

When the worm conveyor has fed a predetermined quantity of the dry curd to the chute to fill a container, a gate is moved across the discharge end of the hopper. The gate comprises a plurality of parallel prong elements connected to a support, giving the gate a fork-like appearance. In operation, the forked gate moves prong-end first, separating, if necessary, any dry curd accumulating at the discharge end of the hopper. Thus, for example, as it moves across the discharge end of the hopper, it separates from the dry curd in the hopper any discharged curd which may cling or adhere thereto. When it is in position across the discharge end of the hopper, it serves as an effective barrier to hold within the hopper the dry curd yet to be discharged into the filling chute. The worm conveyor is intermittently operated to measure a fixed volume of curd during each operation, and, of course, stopping the conveyor after each operation prevents it from forcing any curd through the spaces between the prongs of the gate when the gate is moved to operative positions.

The containers to be filled meanwhile are advanced in line across a platform to a filling position which is directly beneath the filling chute, and the container in position for filling is raised by an elevator into proximity with the discharge end of the chute. Thereupon, the valve gate which supports the predetermined quantity of the substance discharged from the hopper is retracted, permitting the substance to fall through the chute into the empty container, and a tamper moves through the chute to compress or pack the substance within the container.

The elevator is then lowered to return the filled container to the level of the platform, and the container is advanced to a lid-applying mechanism to complete the filling operation.

In the preferred embodiment of the present invention, a plurality of such filling units is arranged side by side above the platform, and the platform includes feeding means for a plurality of lines of containers, the containers in each line being advanced in stepwise fashion to a different filling chute.

In order to facilitate the feed of the dry curd through the hopper, it is preferred that the hopper be formed with straight side walls and that the bottom of the hopper be curved to conform with the circular shape of the worm conveyor with a close tolerance between the outer edges of the threads of the worm and the bottom of the hopper. The straight side walls help to prevent the dry curd from adhering to the side walls out of contact with the worm conveyor. Also, provision may be made for tempering the walls of the hopper to prevent the curd from adhering to it.

The forked gate is a particularly important feature of the present invention because, when operated prong-end first, it can move smoothly through the dry curd without clumps adhering thereto. Furthermore, in spite of the spaces between the prongs, it serves as a very effective barrier across the discharge end of the worm. A conventional type solid gate, even one with a tapered or cutting edge, would have difficulty in passing through the dry curd, and it would be objectionable for the reason that it would break or mash the curd. Also, the dry curd would adhere to a solid gate.

It has been found that the dry curd will adhere to the tampering element which compresses the loose curd within the container, so that as it is raised after the packing operation, it carries with it part of the measured quantity that had been fed to the container. This tendency can, however, be removed by tempering the tampering element, and accordingly provision is made in the present invention for circulating a tempering fluid through it.

For a more complete understanding of the present invention, reference may be had to the detailed description which follows and to the accompanying drawings in which.

Figure 1:
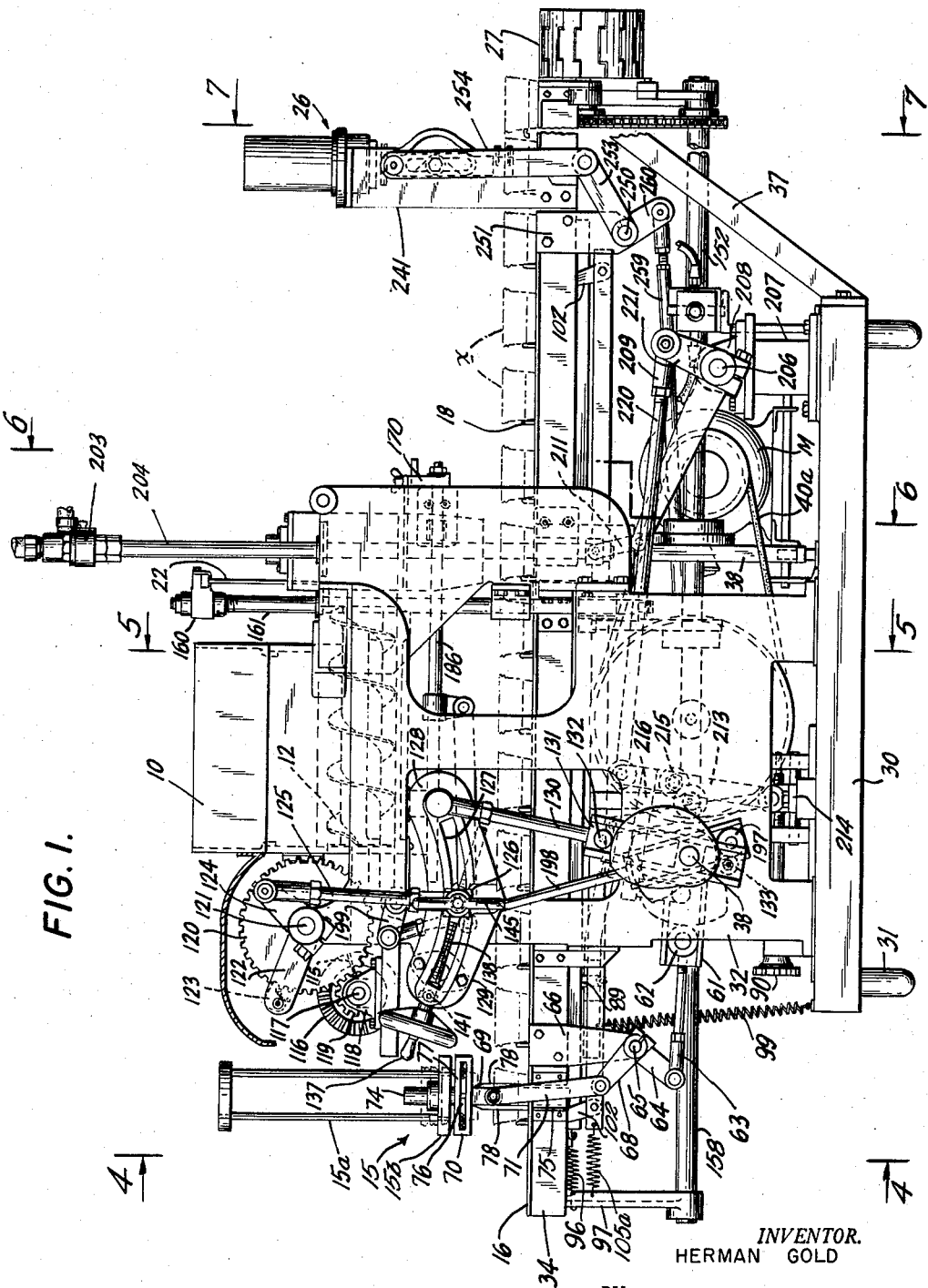
Fig. 1 is a side elevation of the machine.
Figure 6:
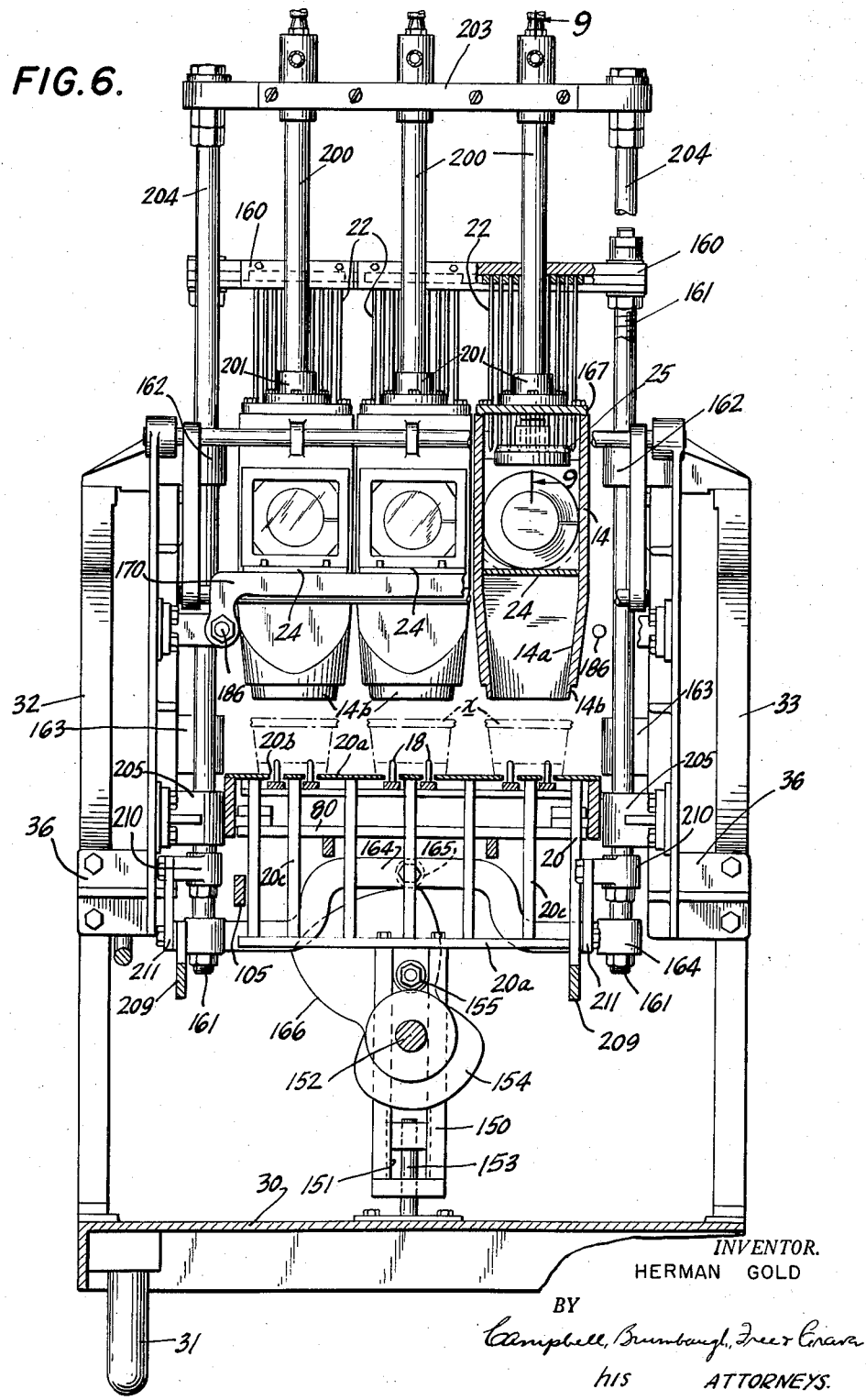
Figure 8:
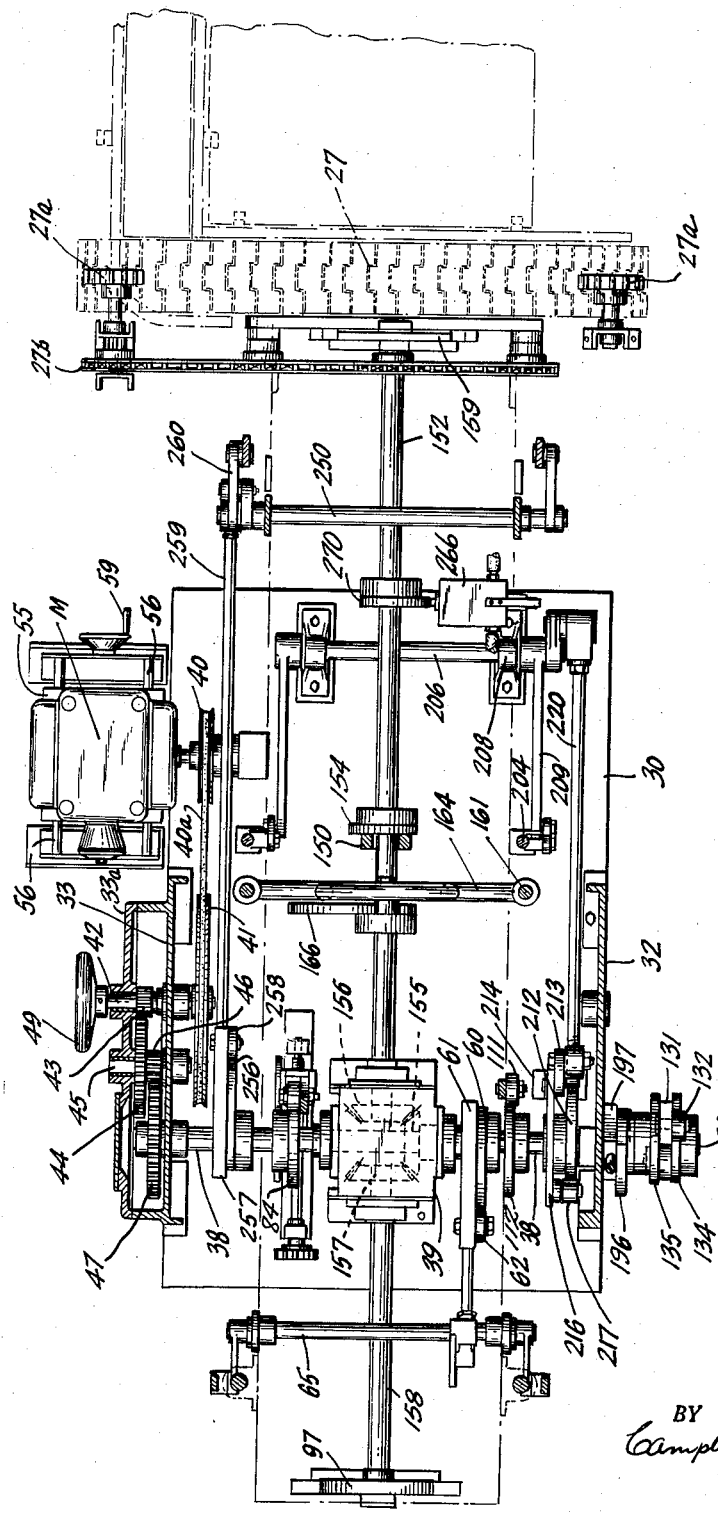
Figure 9:
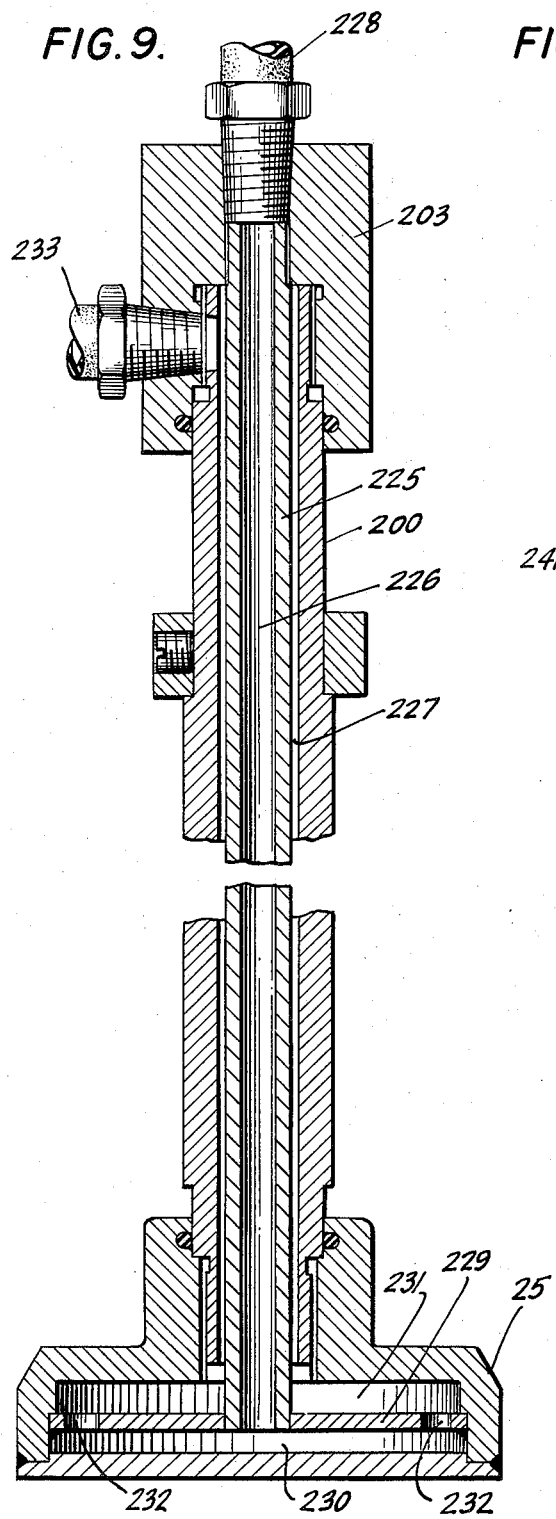
Figure 10:
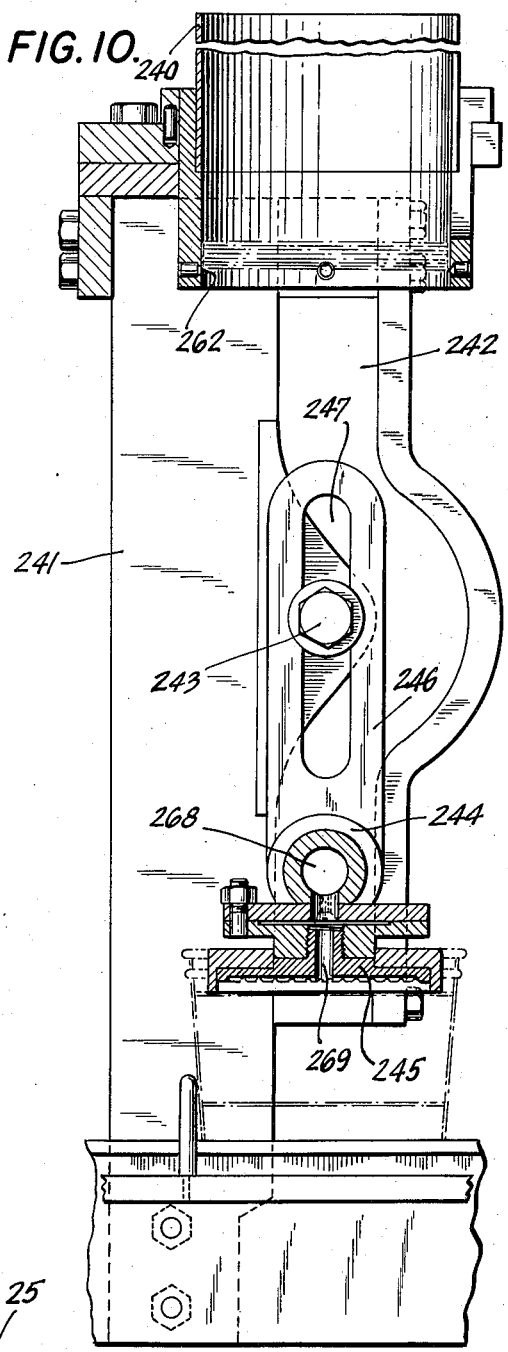

Figs. 4, 5, 6 and 7 are cross-sectional views taken on the lines 4—4, 5—5, 6—6 and 7—7 of Fig. 1, looking in the direction of the arrows;

Fig. 8 is a plan view of the drive mechanism of the machine;

Fig. 9 is an enlarged cross-section view of the tampering element taken on a line 9—9 of Fig. 6, looking in the direction of the arrows; and Fig. 10 is an enlarged view of the capping mechanism of the machine.

General operation

Referring to the drawings, the dry cheese curd to be packed in the containers is fed from a bin 10 to three hoppers 11 disposed side by side. Each of the hoppers contains an intermittently driven rotating worm conveyor 12 therein which advances the dry curd to the discharge end of the hopper. The discharge end of each of the hoppers leads into a chamber 14 formed in part by a sliding valve gate 24, and when the valve gate 24 is moved to inoperative position, the chamber communicates with a tapered filling chute 14a.

The containers $x$ to be filled are released from dispensers 15 onto a platform 16, and the containers are advanced in stepwise fashion along the platform 16 by reciprocating pushers 18 which project through slots 19 extending lengthwise of the platform 16. The container pushers 18 advance the containers during their forward stroke, and at the end of their forward stroke they are retracted beneath the platform 16. They remain retracted during their return stroke while traveling beneath the next container in line, and at the end of their return stroke they are again raised to engage and advance the succeeding containers. When a transverse row of the containers is advanced to filling position beneath the chutes 14a, the containers are raised by an elevator 20, moving the containers into tight fitting contact with the discharge ends of the chutes.

After the worm conveyers 12 have completed a predetermined rotation, thereby discharging a measured quantity of the dry curd into the chambers 14, forked gates 22 are lowered across the discharge ends of each of the hoppers 11 and the further rotation of the worm conveyer 12 is stopped. The forked gates 22 are normally supported in raised position above the discharge ends of the hoppers 11, and when operated to lowered position, the gates move prong-end first across the discharge ends of the hoppers. Moving the gates prong end first permits them to be lowered with a minimum amount of resistance while separating the discharged curd adhering or clinging to the curd still in the hoppers. The dry curd will not adhere, at least in any appreciable quantities, to the thin prongs of the gates, and in spite of the small spaces between the prongs, the forked gates serve as effective barriers to prevent the further discharge of the substance from the hopper into the chute during the container filling operation.

A predetermined quantity of the dry curd is thus delivered during each cycle of the machine to each of the chambers 14. Thereupon the valve gate 24 in each chute slides to inoperative position, permitting the substance to fall through the chute 14a into the empty container. The tamper elements 25, the lower ends of which are normally positioned in the upper ends of the chambers 14, are thereupon lowered through the chutes 14a and into contact with the dry curd in the containers, compressing and packing the dry curd in the containers to the level of the lid seats thereof. The tamper elements 25 thereupon are raised to their start positions, the slidable valve gates 24 closed, and the forked gates 22 raised to inoperative position. The worm conveyers 12 thereupon begin to rotate to deliver measured quantities of the substance to the chambers 14, which measured quantities of the substance will be filled in the next row of empty containers.

Meanwhile, the elevator 20 is lowered to the level of the platform 16, and the filled containers are advanced in stepwise fashion by the reciprocating pushers 18 to the lid-applying apparatus, generally designated 26. The lid-applying apparatus 26 applies the lids to the filled containers, and the containers are thereafter delivered to a moving conveyer 27 which transports them to a collection station.

The basic supporting structure and the main drive

The operating parts of the machine are supported on a base 30 which in turn is supported above the floor by legs 31. Two upright heavy side frames 32 and 33 are supported on opposite sides of the base 30.

The platform 16 is supported by horizontally disposed beams 34 supported from the side frames 32 and 33 by brackets 36, and the beams 34 are given additional support at the delivery end of the machine by the braces 37 shown in Fig. 1.

The main drive shaft 38 of the machine extends transversely between the side frames 32, 33, and the shaft 38 supports cams which control certain of the operations of the machine. The shaft 38 is supported at one end in a bearing of the side frame 32 and at the other end in a bearing of the side frame 33. As best shown in Fig. 8, the shaft is given additional support at its center by bearings 39b of a housing 39. The housing 39 is mounted above the base 30 of the machine by vertical supports or legs 39a.

The main drive shaft 38 of the machine also drives fore-and-aft shafts 152 and 158, the shaft 152 extending at right angles to the shaft 38 and running in the direction of the delivery end of the machine, and the shaft 158 extending at right angles to the shaft 38 and running in the direction of the feed end of the machine.

The housing 39 also includes bearings 39b for the rear end of the shaft 152 and for the forward end of the shaft 158. The forward end of the shaft 152 is supported in a bearing of a structure 159, and the rear end of the shaft 158 is supported in a bearing of a structure 97. The structures 97 and 159 are supported between the horizontal beams 34 of the machine. The shaft 38 carries a bevel gear 155 (see Fig. 8) which meshes with a bevel gear 156 of the shaft 152 and also with a bevel gear 157 of the shaft 158.

Figure 5:
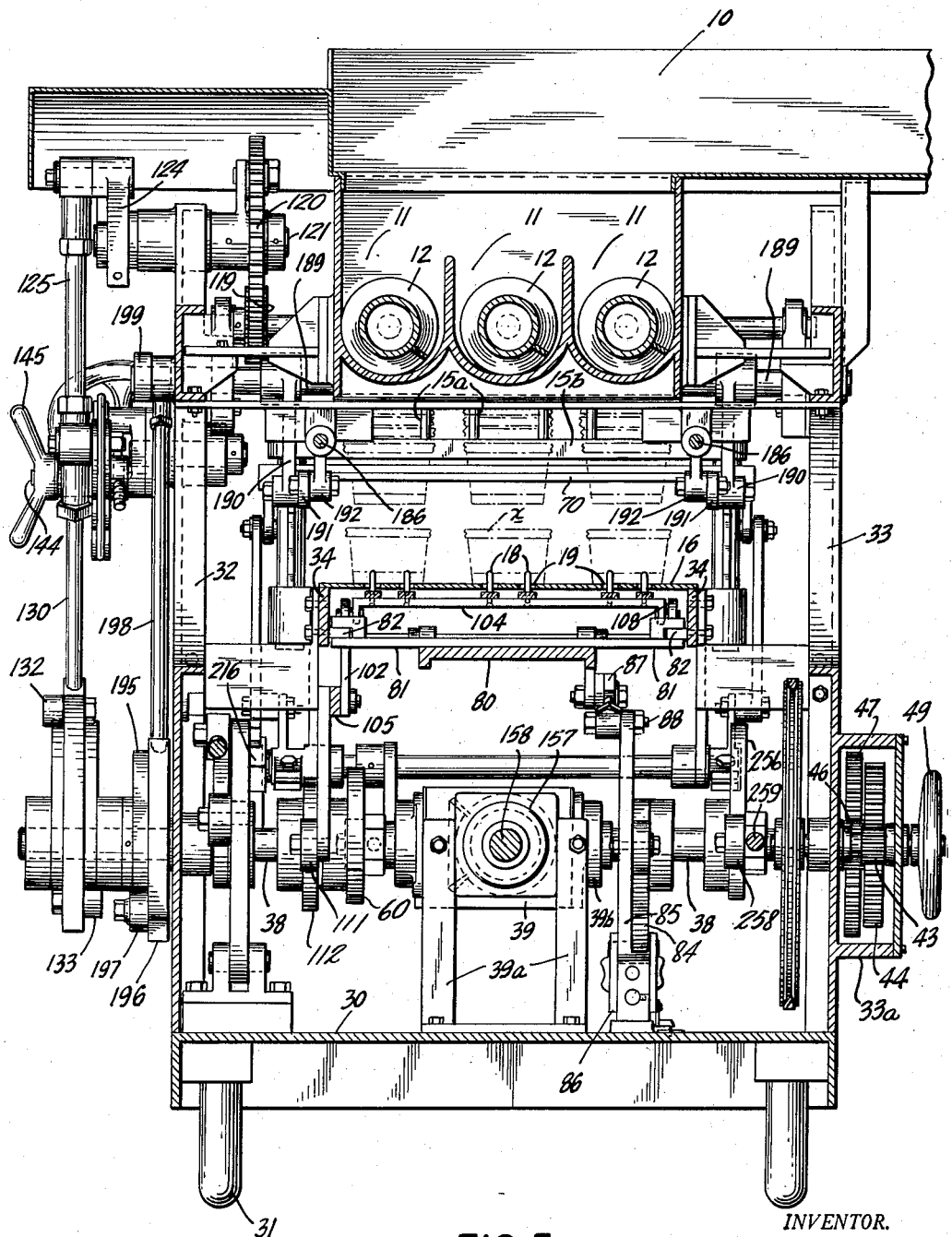

The shaft 38 is driven by an electrical motor M. Referring to Fig. 8, the drive transmission through which the shaft 38 is driven includes a pulley 40 on the drive shaft of the motor M, a pulley 41 on an idler shaft 42, a belt 40a connecting the pulleys 40, 41, a gear 43 mounted on the shaft 42, a gear 44 mounted on an idler shaft 45 and meshing with the gear 43, a gear 46 also mounted on the shaft 45 and a gear 47 carried at the extreme end of the cam shaft 38. The gears 43, 44, 46 and 47 are enclosed within a housing 33a connected to the outer face of the frame 33. As best shown in Figs. 5 and 8, the extreme end of the shaft 42 is provided with a hand wheel 49 by means of which the cam shaft may be turned over by hand.

In order to permit the tension of the belt 40a to be regulated as desired, provision is made for mounting the motor M in such fashion that it can be adjusted relatively to the main base 30 of the machine. Accordingly, the motor is supported on a platform 55 which is slidably mounted on a pair of parallel rods 56. The rods 56 are supported at both ends in frames 57. The frames 57 also serve as a bearing for a screw 58, and the screw 58 is threaded through accommodating holes in the platform 55 so that the rotation of the screw will move the platform 55 on the rods 56. The extreme end of the screw 58 carries a hand wheel 59 by means of which the screw may be adjusted.

The container dispensing mechanism

The containers $x$ as mentioned above are stored in and released from dispenser units 15, and there is a dispenser unit provided for supplying containers to each of the filling chutes 14a. During each machine cycle, each of the container dispenser units releases a container and the containers are advanced in stepwise fashion along the top of the platform 16 until they are moved into position beneath the chute 14a in preparation for the filling operation.

Figure 4:
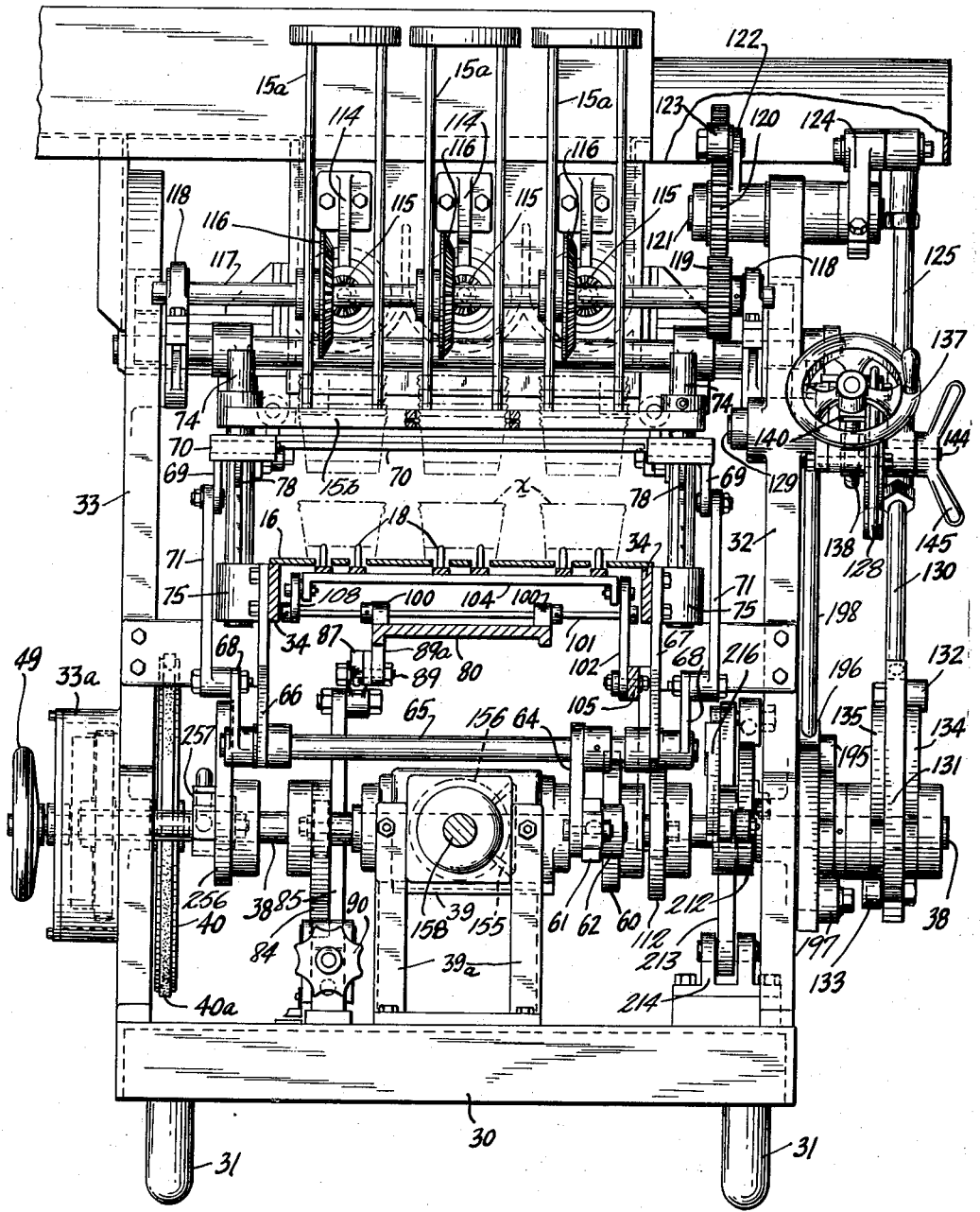

As best shown in Figs. 1, 4 and 8, the operation of the container dispenser units 15 is controlled from the cam shaft 38 of the machine by a cam 60 thereon. Immediately adjacent the cam 60 is a slotted member or yoke 61 which carries cam followers 62 at both ends thereof. The shaft 38 passes through the slot formed in the yoke 61, and consequently the axial displacement as well as the angular position of the yoke 61 is controlled by the engagement of the cam rollers 62 with the periphery of the cam. The yoke is connected as best shown in Fig. 1, by means of a rod 63 to an arm 64 of a rock shaft 65, and the rock shaft 65, as best shown in Fig. 4 is supported at opposite ends by the brackets 66 and 67. The brackets 66 and 67 are each mounted at their upper ends to one of the horizontal beams 34, and the brackets 66 and 67 extend downwardly below the beams. The extreme ends of the rock shaft 65, as best shown in Fig. 4, are provided with arms 68, and the arms 68 are connected to the downwardly disposed legs 69 of a horizontally disposed frame 70 by means of the links 71. Thus, by means of the mechanical connection just described the horizontal frame 70 may be raised and lowered to withdraw a container from each of the receptacles 15a and to deliver them to the top of the platform 16.

The horizontally disposed frame 70 is guided for vertical movement by a pair of vertical rods 74, one at each side of the machine, and the lower ends of rods 74 are supported by the brackets 75 attached to the horizontal beams 34.

The actual container dispensing mechanism forms no part of the present invention, however, in its preferred form the containers are supported in their receptacles 15a by retainer means accommodated in a horizontally disposed frame 15b which extends across the lower ends of the receptacles 15a and is supported between the rods 74. The frame 15 is provided with an aperture beneath each of the receptacles 15a to permit the release of the lowermost container therefrom, and the retainer means, which may extend beyond the edges of the openings to engage the rims of the lowermost containers, may be yieldable to permit the lowermost containers to be pulled through the openings.

The removable frame 70 may accommodate oppositely disposed gripper plates 76, 77 (see Fig. 1) normally spring-urged toward each other to engage the lowermost containers of each receptacle. Thus, as the frame descends, the lowermost containers are released from their storage receptacles, and as the frame 70 continues to move downwardly, the plates 76, 77 engage the outwardly tapering cams or fins 78 formed on opposite sides of the bars 74, thereby spreading apart the gripper plates 76, 77 to discharge the containers on the platform 16. On the upstroke the spring-urged container gripping plates 76, 77 are restored to operative position to grip the next group of containers in line as soon as the frame 70 is raised high enough to transport the plates 76, 77 out of contact with the cams 78.

*The container advancing means*

As described above, the containers are moved in stepwise fashion along the upper surface of the platform 16 by the reciprocating retractable fingers 18 which project upwardly through slots 19 formed in the platform.

Figure 3:
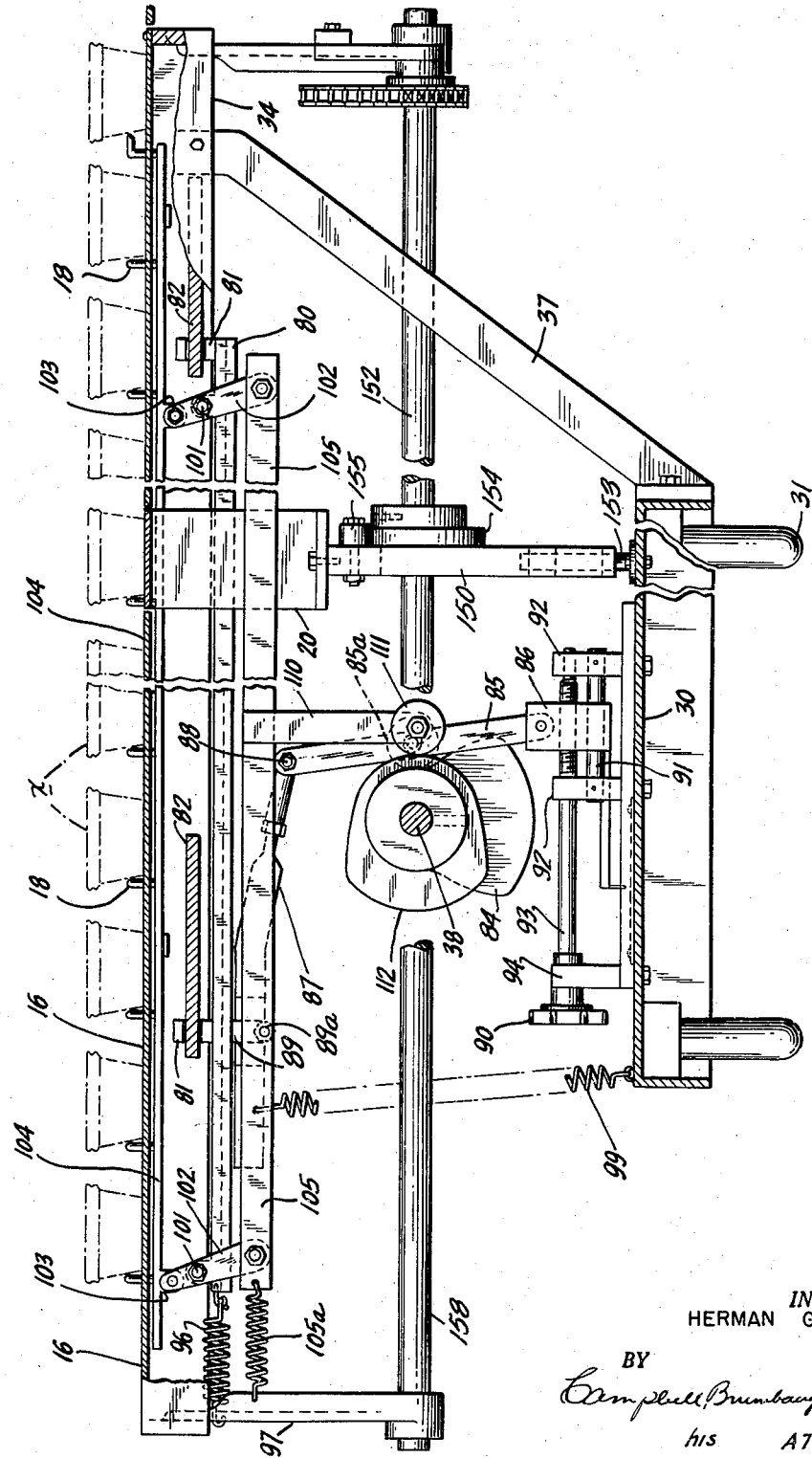
Fig. 3 is an enlarged side elevation of the mechanism for feeding the containers.
Figure 7:
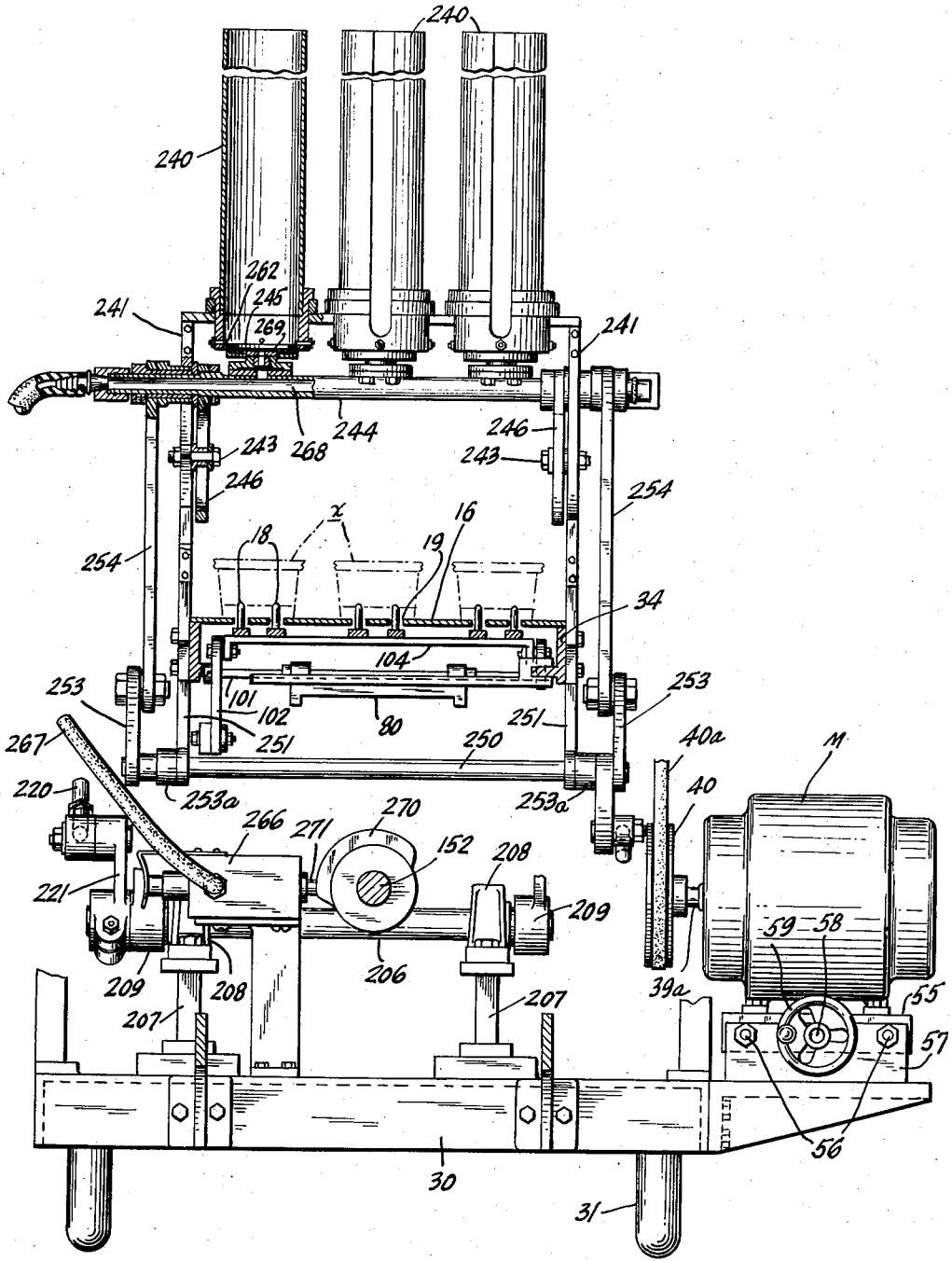

As best shown in Figs. 3, 5 and 7, a horizontally disposed slide 80 is supported beneath the platform 16 by arms 81 which extend from both sides of the slide 80. The ends of the arms 81 are provided with grooves which engage in sliding contact with rails 82 formed on the inside faces of the beams 34. Thus supported, the slide 80 can be reciprocated in a horizontal plane and in fore-and-aft directions relative to the platform 16.

The means for reciprocating the slide 80 is best shown in Fig. 3 and includes a cam 84 mounted on the cam shaft 38 of the machine, a lever 85 pivotally mounted at its lower end in an adjustable block 86, and a member 87 pivotally connected at 88 to the lever 85 and having a notch formed in its lower edge which engages a horizontally disposed shaft 89a of a downward extension 89 of the slide 80. The lever 85 carries a roller 85a which follows the surface of the cam 84 thereby imparting the reciprocating motion to the slide 80.

The notched member 87 is maintained operatively engaged with the shaft 89a by a tension spring 99 connected between the extreme free end of the member 87 and the base 30. As best shown in Fig. 3, a frame 97 extends downwardly from the parallel beams 34, and a tension spring 96 is connected between the slide 80 and the frame 97. Thus, the spring 96 serves to maintain the cam follower 85a in contact with the cam 84.

The block 86 which serves as the pivot for the lower end of the lever 85 may be adjusted by means of the knob 90 to control the length of the stroke of the reciprocating slide 80. Accordingly, the block 86 is moveably mounted on rods 91 suspended between the supports 92 which sit on top of the base 30. The supports 92 also serve as bearings for a shaft 93, threaded at one end to engage the block 86. The knob 90 is connected at the extreme end of the shaft 93, and the shaft 93 is given additional support at this end by a support 94 which also serves as a bearing for the shaft. When the shaft 93 is rotated by turning the knob 90, the block will be shifted in one direction or the other by means of the threaded portion of the shaft, thereby shifting the pivot of the lever 85 which, of course, changes the stroke of operation of the lever.

As best shown in Figs. 3 and 4, the horizontally disposed slide 80 carries transverse shafts 101, the ends of which extend beyond the side edges of the slide, and the shafts 101 serve as pivots for levers 102 and 108 which support a horizontally disposed plate 104 above the slide 80. The plate 104 carries the upwardly disposed fingers 18 which serve to advance the containers along the platform 16. The transverse shafts 101 are supported above the upper surface of the slide 80 between bosses 100 formed along both side edges of the slide 80. The levers 108 are pivotally mounted at their lower ends on the shafts 101, and their upper ends are pivotally connected to bosses 103 formed beneath the plate 104. There are at least two levers 102 centrally pivoted on the shafts 101 on the same side of the slide 80 in lieu of levers 108. Like the levers 108, the upper ends of the levers 102 are pivotally connected to bosses 103 beneath the plate 104; the lower ends, however, are pivotally connected to a horizontally disposed fore-and-aft bar 105.

As best shown in Fig. 3, the horizontal bar 105 carries a cam roller 111 from a downwardly depending member 110, and the cam roller 111 follows the surface of a cam 112 of the cam shaft 38b. The extreme end of the bar 105 is connected to the frame member 97 by means of a tension spring 105a, and the spring 105a serves to maintain the cam follower 111 in contact with the surface of the cam 112.

As mentioned above, the upwardly disposed pusher fingers 18 of the plate 104 serve to advance the containers x stepwise along the upper surface of the platform 16. To impart the prescribed operation to the pusher fingers 18, the plate 104 must be moved in a horizontal direction during the container advancing stroke, lowered to retract the fingers, moved in the opposite direction during the return stroke of the fingers, and then raised preparatory to the next container advancing stroke.

This operation can best be explained by reference to Fig. 3. The cam 84 serves to impart the advance and return stroke in a horizontal plane to the plate 104, and the cam 112 serves to effect the raising and lowering of the plate 104. During the container advancing stroke, the rotation of the cam 84 pivots the lever 85 in a clockwise direction to translate the slide 80 to the right. The plate 104, being supported above the slide 80 by means of the levers 102 and 108, will be carried along with the slide 80, and during this movement of the plate 104, the raised fingers 18, moving relative to the platform 16 in the slots 19 thereof, will push the containers a predetermined distance along the top of the platform. As best shown in Fig. 7, there are two such fingers 18 situated side by side associated with each container, so that the container will be effectively advanced thereby.

Near the completion of the forward stroke of the plate 104, that is the stroke to the right, as viewed in Fig. 3, the cam 112 will move the bar 105 in a rightward direction. This movement of the bar 105 will pivot the levers 102 on the shafts 101 in counterclockwise directions to lower the plate 104, thus retracting the fingers 18 beneath the upper surface of the platform.

When the cam follower 85a comes into contact with a decline of the cam 84, the slide 80, and consequently also the upper plate 104 supported thereby, will be returned through the action of the spring 96. During this return stroke, the cam 112 will insure that the fingers 18 will remain in their downward retracted position. At the completion of the return stroke of the slide 80 and the plate 104, the cam 112 will move the bar 105 relatively to the slide 80 to pivot the levers 102 in a clockwise direction, thereby raising the plate 104 and the fingers 18 thereof, so that the fingers 18 will be in a position to engage the succeeding containers on the platform 16.

*The drive for the worm conveyor*

Figure 2:
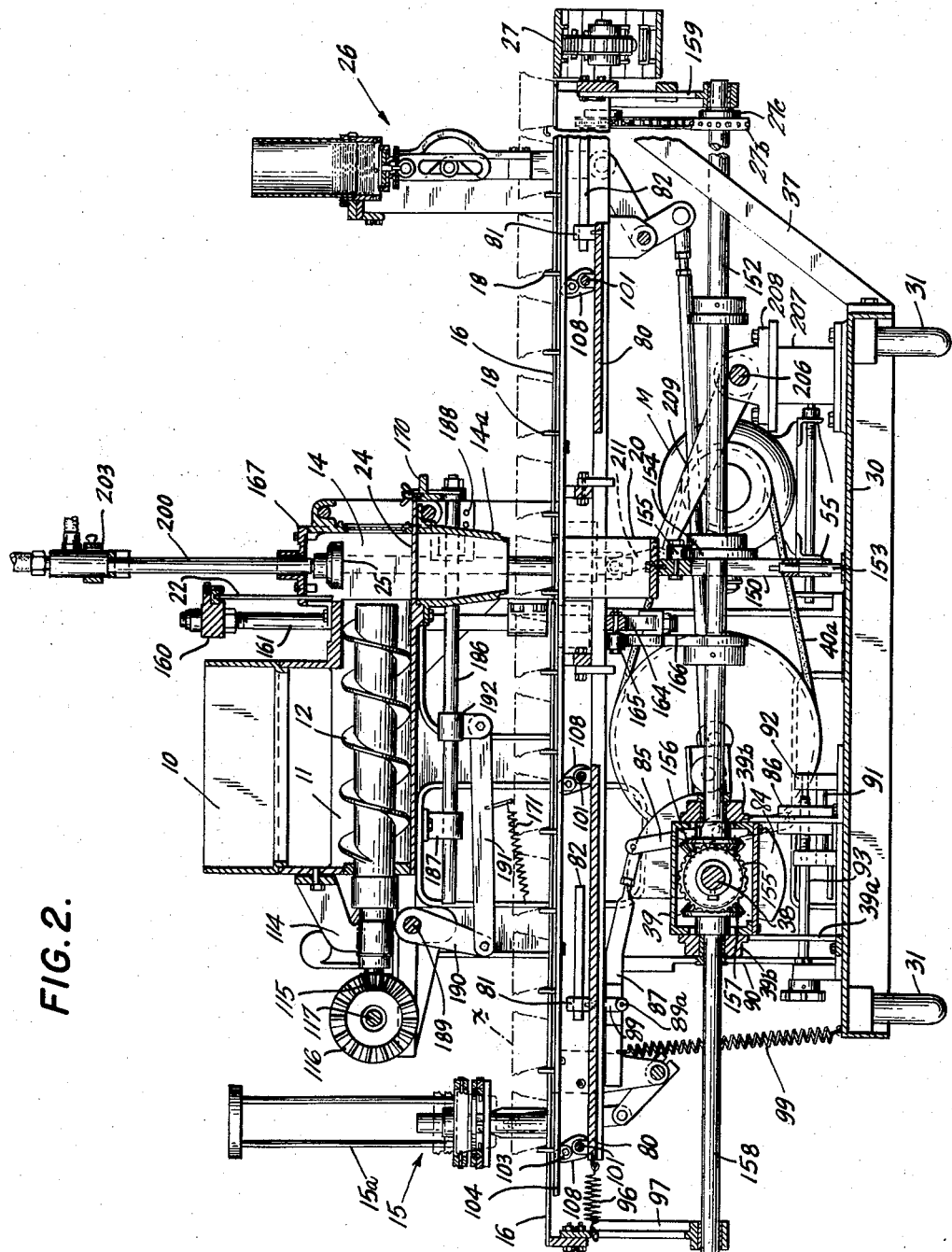
Fig. 2 is a cross-sectional view similar to Fig. 1.

A predetermined rotation is imparted to the worm conveyors 12 during each cycle of the machine. As best shown in Fig. 2, the square worm shafts are provided with extensions which carry bevel gears 115, and the bevel gears mesh with bevel gears 116 of a transverse shaft 117. The extensions are rotatable in bearings of brackets 114, and the brackets are mounted to the rear wall of the bin 10.

The transverse shaft 117, as best shown in Figs. 1 and 4, is supported at both ends in bearings 118 which are connected to the side frames 32 and 33 of the machine. The shaft 117 carries a gear 119 at one end thereof which meshes with a gear 120 loosely supported on a reciprocating rock shaft 121. The rock shaft 121 is supported at the upper end of the side frame 32 of the machine, and the rock shaft 121 carries an arm 122 having a pivotal pawl 123 thereon. As the rock shaft 121 is reciprocated, it imparts a pivotal reciprocating motion to the arm 122. The pawl 123, as the arm 122 moves in the direction, engages the teeth of the gear 120 and imparts a predetermined rotation thereto, whereas when the arm 122 is moved in the opposite direction, the pawl 123 merely rides over the teeth of the gear 120 having no driving effect thereon. It is evident, therefore, that during each clockwise pivotal movement of the arm 122, as viewed in Fig. 1, the pawl 123 will impart a predetermined rotation to the gear 120 which, in turn, will impart a predetermined rotation to each of the worm conveyers 12.

The rock shaft 121 is driven from the cam shaft 38 of the machine. Accordingly, the extreme end of the shaft 121 carries an arm 124, and the arm 124 is connected by means of a rod 125 to an adjustable rider 126 accommodated within the arcuate slot 127 of a curved lever 128. One end of the lever 128 is pivotally connected by means of a shaft 129 to the side frame 32, and the opposite free end of the lever, as shown in Fig. 4, is connected by means of a rod 130 to a yoke 131. The yoke 131 is provided with a slot through which the cam shaft 38 passes. The yoke 131 carries a cam follower 132 above the slot and a cam follower 133 at the lower end of the slot, the cam followers 132 and 133 being carried on opposite sides of the yoke. The upper cam roller 132 engages the surface of a cam 134 on one side of the yoke 131, and the lower cam follower 133 engages the surface of a cam 135 on the other side of the yoke. The cams 134 and 135 thus impart a controlled reciprocation to the yoke 131 which serves to pivot the lever 128 about its pivot 129, and the pivotal movement of lever 128 reciprocates the rock shaft via the link 125 and arm 124.

As explained above, the angle of rotation of the worm conveyers 12 during a cycle of the machine is controlled by the stroke of the arm 122 which, in turn, is determined by the effective length of the lever 128. To permit the quantity of dry curd discharged by the worms 12 during each machine cycle to be regulated, provision is made in the present invention for changing the effective length of the lever 128 by adjusting the position of the rider 126 in the slot 127. The rider 126 is adjustably mounted in the slot 127 by means of the rotation of the hand wheel 137. The hand wheel 137 is mounted on the screw 138, and the screw 138 threadably engages the rider 126 so that the rotation of the hand wheel 137 will move the rider 126 within the slot 127 toward or away from the pivot 129 of the lever 128. When it is desired to impart a greater rotation to the worms 12 during each machine cycle, thereby increasing the quantity of dry curd delivered to the containers x in position to be filled, the hand wheel is rotated in the direction to move the rider 126 away from the pivot shaft 129, and when it is desired to decrease the quantity of dry curd delivered to the containers x in position to be filled, the hand wheel 137 is rotated in the opposite direction to move the rider 126 toward the pivot shaft 129.

The screw 138 is accommodated in a bearing 140 at the extreme end of the lever 128, and the bearing 140 is pivotally connected to the lever 128 by the transverse shaft 141. This pivotal movement which is permitted to the bearing 140 makes it possible for the screw 138 to change its angular position as the rider 126 is adjusted within the slot.

Also, in order to permit the rider 126 to be locked in its adjusted position, the rider 126 carries a screw 144 and a locking nut 145 is threaded on the screw 144. Thus, the nut 145 can be loosened to permit the adjustment of the rider 126 by means of the hand wheel 137, and when the rider 126 is adjusted to the desired position the rider may be locked in that position by tightening the locking nut 145, moving it into locking contact with the outside face of the lever 128.

*The operation of the elevator*

As mentioned above, the cups are moved stepwise along the upper surface of the platform 16 by the pusher members 18 and ultimately they are advanced to a position beneath the filling chutes 14a from which the containers receive the dry curd. In order to facilitate the filling operation, the containers are raised by an elevator 20 into proximity with the discharge ends of the chutes.

As best shown in Fig. 6, the upper surface of the elevator platform 20a is at the same level as the platform 16 when the elevator is in the lowermost position. Like the platform 16, the top surface 20a of the elevator is provided with slots 20b which coincide with and form continuations of the slots 19 formed in the platform 16, and the slots 20b accommodate the fingers 18 to permit the containers x to be advanced stepwise onto and off of the surface 20a of the elevator.

The upper platform 20a of the elevator as shown in Fig. 6, is supported by a plurality of vertically disposed frame members 20c which, in turn, are all supported above a horizontal base 20d. The base 20d is mounted above a vertical yoke 150, and the lower end of the yoke is guided for vertical movement by means of a guide rod 153 upstanding from the main base frame 30.

The yoke 150 and the elevator 20 are raised and lowered by a cam 154 mounted on the fore-and-aft shaft 152. The yoke is provided with a slot 151 through which the shaft 152 extends, and the yoke carries a cam follower roller 155 which is disposed above the slot 151. The weight of the elevator maintains the cam follower in contact with the surface of the cam 154, and the rotation of the cam 154 raises the elevator, bringing the containers *x* thereon into proximity with the discharge ends of the chutes 14*a*. It may be noted in Fig. 6 that the extreme lower ends 14*b* of the chutes 14*a* are of slightly reduced diameter so that the upper ends of the containers will be brought into telescoping relationship with the chutes when the elevator is raised.

The operation of the forked gate

As mentioned above, when a measured quantity of the dry curd is discharged from the hopper into the filling chute, the forked gate 22 moves prong-end first across the discharge end of the hopper, separating the dry curd which has been discharged from that which is still in the hopper. This insures that the full measure of the dry curd advanced beyond the discharge end of the hopper by the worm during the cycle of operation will be separated from the mass still within the hopper. Furthermore, when the gate has been moved entirely across the discharge end of the hopper, it serves as an effective barrier to hold the dry curd at the extreme discharge end of the hopper, thereby preventing an excessive quantity of the dry curd from being discharged from the hopper.

The gates 22 each comprise a plurality of spacially separated parallel prongs, tapered at their lower ends and embedded in the support 160 at their upper ends.

As best shown in Fig. 6, there is a forked gate 22 at the discharge end of each of the hoppers, and these three gates are mounted to a common horizontal supporting structure 160. The supporting structure 160 is connected at both ends to vertically movable rods 161, and the rods 161 are movable in guides 163 mounted to the side frames 32, 33. The lower ends of the rods 161 are connected by a transverse member 164.

The supporting structure 160 which carries the forked gates 22, the vertical rods 161 and the transverse member 164 constitute a vertically movable assembly, and the upward and downward movement of the assembly is controlled by a cam 166 mounted on the shaft 152. The cam 166 engages a cam follower 165 carried by the member 164 midway between the rods 161, and the weight of the assembly maintains the cam follower 165 in contact with the periphery of the cam. The cam normally maintains the assembly in raised inoperative position during the feeding operation of the worm conveyers 12, and at the completion of the feeding operation the cam permits the assembly to move downwardly, lowering the gates 22 to operative position across the discharge ends of the hoppers.

The upper ends of the chutes 14*a* above the chambers 14 are enclosed by covers 167 (see Figs. 2 and 6), and the prongs of the forked gates 22, as they are lowered, move in individual holes in the covers 167 above the discharge ends of hoppers.

The operation of the valve gate

The dry curd discharged by the worm conveyors 12 into the chambers 14 of the chutes 14*a* is held therein by the slidable valve gates 24 which are normally in position to prevent the discharge of the dry curd through the chutes 14*a*. When a predetermined quantity of the dry curd has been fed by each of the worm conveyors to the respective chambers 14 and the gates 22 have been lowered across the discharge ends of the hoppers, the slidable gates 24 are moved horizontally to an inoperative position, thereby permitting the dry curd to fall through the chutes 14*a* into the containers below.

The slide gates 24 are connected to a common transverse member 170 which is connected at both ends to fore-and-aft rods 186, and the rods 186 are guided for reciprocating movement in the brackets 187, 188 to shift the gates 24 in a horizontal plane from operative to inoperative positions. As best shown in Fig. 2, the means for imparting reciprocating movement to the rods 186 include a rock shaft 189, a pair of arms 190 maintained at both ends of the rock shaft, brackets 192 fixedly mounted to each of the rods 186, and links 191 connecting the arms 190 with the brackets 192. Springs 171 attached to the arms 190 maintain the gates 24 in closed or operative position.

The rock shaft 189 extends transversely of the machine, and it is mounted at opposite ends in bearings of the side frames 32, 33. Reciprocating movement is imparted to the rock shaft 189, as best shown in Figs. 1 and 5, by the cam 195 carried on the cam shaft 38 through a mechanical linkage which includes a slotted yoke 196 straddling the shaft 38, a cam follower 197 at the lower end of the yoke engaging the surface of the cam 195, an arm 199 connected at the extreme end of the rock shaft 189, and a rod 198 connecting the upper end of the yoke 196 and the arm 199.

During each machine cycle, the rotation of the cam 195 pivots the rock shaft 189, against the action of the spring 171, to move the rods 186 simultaneously in one direction to shift the valve gates 24 to open or inoperative positions, and the spring 171 insures the movement of the rods 186 in the opposite direction to restore the gates 24 to closed position.

The operation of the tamper element

When the valve gates 24 are moved to an inoperative position, the dry curd within the chambers 14 is permitted to fall through the chutes 14*a* into the containers *x* supported in raised position by the elevator 20. Vertically moving tampers 25, normally disposed in raised position within the chambers 14, then descend, traveling through the chutes 14*a*, into contact with the dry curd within the containers to pack the dry curd therein. The tampers are then raised to their starting positions.

The tampers 25, as best shown in Fig. 6, are mounted to the lower ends of tubular supports 200 which are movable within guides 201 of the covers 167 for the chutes. The upper ends of the tubular supports 200 are suspended from a transverse frame 203 which is supported at both ends by vertically movable rods 204. The rods 204 are movable within upper guides 162 and lower guides 205 of the side frames 32, 33 respectively.

A vertical upward and downward movement is imparted to the rods 204, thereby causing the tampers 25 to move upwardly and downwardly, by the reciprocation of a rock shaft 206 (see Figs. 1 and 2). The rock shaft 206 is mounted in bearings 208 which are supported above the main base frame 30 of the machine by legs 207. The rock shaft carries arms 209 disposed just outboard of the bearings 208, and, as best shown in Fig. 6, the arms 209 are connected by links 211 to sleeves 210 on vertically movable rods 204. Thus, when the rock shaft is reciprocated in one direction, the rods 204 are raised, thereby raising the tamper elements 25, and when the rock shaft 206 is pivoted in the opposite direction the rods 204 are lowered, thereby lowering the tampering elements.

As best shown in Figs. 4 and 8, reciprocating motion is imparted to the rock shaft 206 by a cam 212 on the cam shaft 38. The cam 212 controls the operation of a vertically disposed lever 213 (see Figs. 1 and 4) pivotally mounted at its lower end to a pedestal 214 anchored to the base frame 30 of the machine. The lever 213 carries a cam roller 215 thereon which engages the surface of the cam 212. In addition, in order to impart a positive movement in both directions to the lever 213, the lever carries another cam roller 217 which engages the opposite side of the cam 212. The cam roller 217 is carried at the end of an extension member 216, as best shown in Figs. 4 and 8.

The extreme upper end of the lever 213 is pivotally connected to one end of a long rod 220 and the other end of the rod 220 is pivotally connected to an arm 221 mounted at the extreme end of the rock shaft 206. The pivotal movement imparted to the lever 213 by the cam 212 is thus translated to the rock shaft 206 to raise and lower the tamper elements 25 at the appropriate time in the machine cycle.

As mentioned above, because dry cheese curd would otherwise adhere to the tamper element 25 in the packing operation, provision is made for tempering the tamper elements 25 by circulating a tempering fluid through the hollow tubular support 200 and the hollow tamper elements. Accordingly, as best shown in Fig. 9, a concentric tubular member 225 is disposed within the hollow tubular support 200, forming a passage 226 through the tubular member and a passage 227 between the outer periphery of the tubular member 225 and the inner surface of the hollow tubular support 200.

The passage 226 may connect with a flexible inlet line 228 for the fluid, and passage 226 conducts the fluid directly to the hollow tamper element 25. The interior of the hollow tamper element 25, however, is divided into upper and lower regions 230 and 231, respectively, by a partition 229, and the partition 229 is provided with ports 232 by means of which the chamber 230 communicates with the chamber 231. Moreover, the chamber 230 communicates with the passage 226, and the chamber 231 communicates with the passage 227. Thus, fluid from the inlet 228 flows a path through the passage 226, the chamber 230, the ports 232 and the chamber 231 to the passage 227, and the passage 227, in turn, communicates with the outlet conduit 233.

The tempering fluid thus circulated through tamper elements prevents the cheese from adhering to the tamper when it is raised after the packing operation.

The lid-applying mechanism

When the containers have been filled and the dry curd compressed within the containers by the tamper elements 25, the elevator 20 is lowered and the containers advanced off the elevator back onto the surface of the platform 16. The containers are then moved stepwise fashion by the reciprocating pushers 18 until the containers are positioned beneath the lid-applying mechanism, generally designated 26. The containers are then advanced by the pushers 18 to the transversely moving conveyer 27 which transports the filled containers to a receiving station.

As best shown in Fig. 7, the lids or covers for the containers are stacked in magazines 240 supported from the horizontally disposed beams 34 by the vertically disposed members 241. As best shown in Fig. 10, the vertical frames 241 are provided with vertical slots 242, and substantially mid-way between the ends of these slots, the slots are curved about pivot shafts 243. A hollow horizontally disposed transverse shaft 244 extends between the slots 242 of the vertical frames 241, and the hollow shaft 244 carries thereon a plurality of suction heads 245, one for each line of containers. The shaft 244 moves upwardly and downwardly guided by the slots 242, and during this upward and downward travel the shaft is pivoted 180°, so that the suction heads will be upwardly disposed to receive lids from the the magazines when the shaft 244 is at its uppermost position and downwardly disposed to apply the lids to the containers when the shaft 244 is at its lowermost position.

The rotation of the shaft 244 to pivot the suction heads 245 is accomplished by the arms 246 rigidly attached to the shaft and the pivot shafts 243 which engage slots 247 of the arms. More specifically the shaft 244 is provided with the rigid arms 246 at both ends thereof, and as best shown in Fig. 10, the arms 246 contain axial slots 247 therein which accommodate the pivot shafts 243. Thus, as the shaft 244 moves from the raised position and travels through the curved portion of the slot 242, the arms 246 will pivot on the shafts 243, translating the suction heads 245 from an upwardly disposed to a downwardly disposed position. Likewise when the hollow shaft 244 is being raised from lowermost to a raised position, the heads will pivot from a downwardly disposed to an upwardly disposed position.

The vertical movement is imparted to the hollow shaft 244, as best shown in Figs. 1 and 7, by the reciprocation of a transverse rock shaft 250. The rock shaft 250 is supported in bearings 253a of brackets 251 and the brackets 251 are mounted to the horizontal beams 34 of the machine. As best shown in Figs. 4 and 7, both extreme ends of the rock shaft 250 are provided with arms 253 which are connected by means of links 254 to the hollow shaft 244. Thus, the reciprocation of the rock shaft 250 will raise and lower the shaft 244 in the guides 242.

Rotation is imparted to the rock shaft 250 to raise the suction heads by a cam 256 (see Figs. 4 and 8) of the cam shaft 38. The cam shaft 38 accommodates a slotted yoke 257 thereon, and the yoke 257 carries a cam follower 258 which engages the surface of the cam 256. The weight of the suction heads and the supporting structure therefor maintains the cam follower in contact with the surface of the cam.

The yoke 257 is pivotally connected to a long rod 259 which, in turn, is connected at the opposite end to an arm 260 carried at the extreme end of the rock shaft 250. Thus, during each cycle of the machine the cam 256 moves the shaft 244 from a raised position, at which position the heads 245 receive lids from the magazine 240, to a lowermost position, at which position the heads are reversed to apply the lids to the containers, and subsequently back to the raised position.

The lids are contained within the receptacles 240 by detents 262 (see Fig. 10) which may or may not be retractable, and the lowermost lid in each of the receptacles is removed from the receptacles by suction. Accordingly, a suction line 267, as best shown in Fig. 7, leads from a suction pump (not shown) through a solenoid controlled valve, generally designated by the reference numeral 266, to the passage 268 within the hollow shaft 244. As best shown in Figs. 7 and 10, a port 269 leads from the lid receiving surface of the suction head 245 to the passage 268 within the shaft 244.

The valve 266 is normally closed, but the valve 266 is adapted to be opened when the suction heads 245 are raised to withdraw ends from the magazines 240. The operation of the solenoid controlled valve 266 is controlled by a cam 270 of the shaft 152 with the contact arm 271 of an electrical switch. The movement of the contact 271 by its engagement with the raised surface of the cam 270 completes an electrical circuit to open the valve, thereby establishing a suction surface on the suction heads 245. The suction is maintained while the shaft 244 is descending until the heads 245 have applied the lids to the containers x, whereupon the valve 266 is closed and the suction broken. Thus, the heads 245 may be raised away from the containers free of the lids which they have deposited thereon.

The conveyer

After the capping operation the containers x may be advanced stepwise to the conveyer 27 which moves at right angles to the discharge end of the platform 16. The conveyer forms no part of the present invention, and, consequently, it will not be necessary to describe it in detail. It suffices to say, however, that the conveyer is an endless flexible type which passes around sprockets 27a, and one or more of the sprockets 27a are driven from a sprocket gear 27c mounted fore-and-aft at the forward end of the shaft 152.

The invention has been shown in a single preferred form and by way of example only, and obviously many variations and modifications may be made therein without departing from the spirit of the invention. The invention therefore is not to be limited to any specified form or embodiment except in so far as such limitations are set forth in the appended claims.

I claim:

1. A machine for filling containers with a measured quantity of a crushable substance comprising a hopper for receiving the substance to be delivered to the container, a rotatable conveyor having a continuous spiral thread for advancing a predetermined quantity of the substance to the discharge end of the hopper during each filling cycle of the machine, the bottom of said hopper having a curved surface closely spaced to the outer perimeter of the spiral thread to permit the rotatable conveyor to advance the substance through the hopper without the formation of pockets and without crushing the substance, means for driving said conveyor intermittently, a movable gate at the discharge end of the hopper, a plurality of parallel, closely spaced prongs and a common support to which said prongs are connected at one end forming the gate, the gate being maintained in an operative position during the container-filling operation, stationary means having openings therein for individually guiding each of the prongs and for preventing the substance from adhering to the prongs and means for moving the gate prong-end first across the discharge end of the hopper between intermittent operations of the conveyor to retain the substance within the hopper and to insure the separation of the substance outside the hopper from the substance within the hopper without crushing the substance.

2. A machine for feeding a measured quantity of a pasty substance having poor flow characteristics to a container comprising a hopper for receiving the substance, said hopper having a discharge end, a chute communicating with the discharge end of the hopper to guide the substance discharged from the hopper into the container, a rotatable worm conveyor within the hopper to advance the substance toward the discharge end, a movable gate formed by a plurality of closely spaced, parallel prongs at the discharge end of the hopper, the gate being retracted during the container-filling operation to permit the passage of the substance from the hopper to the chute, and means for moving the gate prong-end first into operative position across the discharge end of the hopper to insure the separation of the substance outside the hopper from the substance within the hopper.

3. A machine as set forth in claim 2 wherein the hopper is formed with straight side walls and wherein the bottom is curved to conform to the curvature of the major diameter of the worm conveyer.

4. A machine as set forth in claim 2 including a gate within the chute, the gate being normally in a position to prevent the passage of the substance discharged from the hopper through the chute, and means for moving the gate to inoperative position to permit the passage of the substance through the chute.

5. A machine as set forth in claim 2 including drive means for imparting a predetermined rotation to the worm conveyer during each machine cycle.

6. A machine for filling containers with a substance comprising a hopper for receiving the substance, said hopper having a discharge end, a chute in constant communication with the discharge end of the hopper to guide the substance from the hopper to an empty container, means for discharging a predetermined quantity of the substance from the hopper to the chute, a gate within the chute to prevent the passage of the substance discharged to the chute, means for delivering an empty container to a filling position beneath the chute, a tamper element normally disposed at the upper end of the chute, means for moving the gate to inoperative position to release the quantity of substance delivered to the chute, means for moving the tamper element through the chute to pack the substance in the container, and a gate movable across the discharge end of the hopper which insures the separation of the substance outside the hopper from the substance within the hopper and prevents the discharge of the substance from the hopper during the container-filling operation.

7. A machine as set forth in claim 6 including an elevator disposed beneath the discharge end of the chute, said elevator receiving a container to be filled, and means for raising the container into proximity with the discharge end of the chute.

8. A machine as set forth in claim 6 wherein the tamper element includes inlet and outlet ports, and a passage for a tempering fluid running through the tamper element between the inlet and outlet ports.

9. A machine for filling containers with a substance comprising a hopper for receiving the substance, said hopper having a discharge end, a filling chute communicating with the discharge end of the hopper to guide the substance discharged from the hopper into the container, an intermittently rotatable worm conveyor having a continuous spiral thread formed thereon within the hopper to advance the substance toward the discharge end of the hopper, the hopper being formed with a curved bottom and straight side walls, a movable gate at the discharge end of the hopper, means for imparting a predetermined rotation to the worm conveyor during each machine cycle, whereby a predetermined quantity of the substance is discharged from the hopper into the chute, said means including a pivotally reciprocating arm, means for imparting reciprocation to said arm, a member pivotally connected to said arm for reciprocation thereby, means for translating the reciprocation of the reciprocating member into rotation of the worm conveyor, the rotation of the worm conveyor during each machine cycle being determined by the stroke of said reciprocating member, and adjustable means for varying the distance between the pivot of said reciprocated member and the pivot of said reciprocating arm to vary the rotation imparted to the worm conveyor during each machine cycle and means for moving the gate across the discharge end of the hopper at the completion of the predetermined rotation of the worm conveyor.

10. A machine as set forth in claim 9 including means for tempering the walls of the hopper to prevent the substance from adhering thereto.

11. A machine for filling containers with a measured quantity of a pasty substance having poor flow characteristics comprising a hopper for receiving the substance, said hopper having a discharge end, a filling chute communicating with the discharge end of the hopper to guide the substance to a container, an intermittently rotatable worm conveyor within the hopper to advance the substance toward the discharge end thereof, drive means to impart a predetermined periodic rotation to the worm conveyor, a fork-type gate comprising a plurality of individual, substantially parallel prongs, and means for moving the fork-type gate across the entire discharge end of the hopper, prong-end first, at the completion of each periodic rotation imparted to the worm conveyor, the fork-type gate separating the substance beyond the discharge end of the hopper during its movement across the discharge end of the hopper and serving as an effective barrier across the discharge end of the hopper in the closed position of the gate.

12. A machine for filling containers with a substance comprising a hopper for receiving the substance, said hopper having a discharge end, a filling chute communicating with the discharge end of the hopper to guide the substance to a container, an intermittently rotatable worm conveyer within the hopper to advance the substance toward the discharge end thereof, drive means to impart a predetermined rotation to the worm conveyer, a fork-type gate comprising a plurality of individual, substantially parallel prongs, means for moving the fork-type gate across the discharge end of the hopper, prong-end first, at the completion of the predetermined rotation imparted to the worm conveyer, the fork-type gate separating the substance beyond the discharge end of the hopper during its movement across the discharge end of the hopper and serving as an effective barrier across the discharge end of the hopper in the closed position of the gate, a normally closed gate within the chute, a tamper element normally in a raised inoperative position in the chute, means for opening the gate in the chute at the completion of the predetermined rotation of the worm conveyer to discharge the substance through the chute, and means for moving the tamper element through the chute to pack the substance within the container.

References Cited in the file of this patent

UNITED STATES PATENTS

| | | |
|---|---|---|
| 225,028 | Straub | Mar. 2, 1880 |
| 328,439 | Tickle et al. | Oct. 13, 1885 |
| 655,967 | Felton | Aug. 14, 1900 |
| 1,463,457 | Beckmann | July 31, 1923 |
| 1,789,051 | Opitz | Jan. 13, 1931 |
| 2,518,757 | Coley et al. | Aug. 15, 1950 |